United States Patent [19]

Fong et al.

[11] Patent Number: 5,219,291
[45] Date of Patent: Jun. 15, 1993

[54] ELECTRONIC EDUCATIONAL VIDEO SYSTEM APPARATUS

[75] Inventors: Chi-Ming Fong, New Territories; Wai-Kwok Chew, Tai Po, N.T.; Garry C. Law, Kowloon, all of Hong Kong

[73] Assignee: Video Technology Industries, Inc., Wheeling, Ill.

[21] Appl. No.: 869,198

[22] Filed: Apr. 10, 1992

Related U.S. Application Data

[63] Continuation of Ser. No. 687,779, Apr. 19, 1991, abandoned, which is a continuation of Ser. No. 234,257, Aug. 19, 1988, abandoned.

[30] Foreign Application Priority Data

Oct. 28, 1987 [GB] United Kingdom ................. 8725204

[51] Int. Cl.[5] .......................... G09B 7/04; G09B 15/00
[52] U.S. Cl. ...................................... 434/323; 434/327; 434/335; 434/309; 434/201; 434/161; 84/470 R
[58] Field of Search ................. 434/167, 169, 201, 202, 434/308, 309, 318, 323, 324, 327, 335; 273/433, 434, 437, 237, DIG. 28; 84/470 R

[56] References Cited

U.S. PATENT DOCUMENTS

| | | | |
|---|---|---|---|
| 3,999,307 | 12/1976 | Tsuda et al. | 434/324 |
| 4,156,928 | 5/1979 | Inose et al. | 364/900 |
| 4,360,345 | 11/1982 | Hon | 434/323 |
| 4,378,720 | 4/1983 | Nakada et al. | 84/470 R |
| 4,399,731 | 8/1983 | Aoki | 84/470 R |
| 4,419,540 | 12/1983 | Henderson | 434/167 |
| 4,421,487 | 12/1983 | Laughton et al. | 434/169 |
| 4,447,213 | 5/1984 | Culley | 434/201 |
| 4,516,260 | 5/1985 | Breedlove et al. | 434/169 |
| 4,588,187 | 5/1986 | Dell | 273/1 E |
| 4,593,904 | 6/1986 | Graves | 434/323 |
| 4,804,328 | 2/1989 | Barrabee | 434/323 |
| 4,816,810 | 3/1989 | Moore | 340/710 |
| 4,878,843 | 11/1989 | Kuch | 434/112 |

FOREIGN PATENT DOCUMENTS

| | | |
|---|---|---|
| 0044642 | 1/1982 | European Pat. Off. |
| 0145598 | 8/1985 | European Pat. Off. |
| 2116770 | 9/1983 | United Kingdom |
| 2121587 | 12/1983 | United Kingdom |
| 2175728 | 12/1986 | United Kingdom |
| 2198871 | 6/1988 | United Kingdom |

OTHER PUBLICATIONS

King Tai Computer Industries, Ltd., "Computer Learning Guide For Youths", 1986.
Nintendo F-Basic Publication, 1986.
Description of Cae Project, (Translation) from Taiwanese Patent Office, Sep. 1989.
Video Technology Electronics, Ltd. Product Catalog, Electronic learning aid, 1988.

Primary Examiner—Jessica J. Harrison, Jr.
Attorney, Agent, or Firm—Dick and Harris

[57] ABSTRACT

An electronic educational video system apparatus for connection to a standard television receiver for teaching basic skills to a child through the use of animated graphic displays which serve to motivate the child to utilize the apparatus and enhance the child's learning. A microprocessor cooperates with digital memory, a video generator, a sound generator, and a voice synthesizer to generate a display of a pictorial representation upon the television receiver combined with a request associated with the pictorial representation directing the child to provide a proposed correct response. The child's correct response is compared to the actual correct response stored in the digital memory so that the particular pictorial representation associated with a particular request may become animated to provide an indication to the child of the correctness of the child's response. The child may provide his or her response through a plurality of interchangeable input devices.

14 Claims, 9 Drawing Sheets

ELECTRONIC EDUCATIONAL VIDEO SYSTEM APPARATUS

This is a continuation of application Ser. No. 07/687,779, filed Apr. 19, 1991, now hereby abandoned, which was a continuation of Ser. No. 07/234,257, filed on Aug. 19, 1988, now abandoned.

BACKGROUND OF THE INVENTION

The present invention relates generally to electronic educational devices and, in particular, to an electronic educational video system apparatus for use with a standard television receiver wherein animated graphic displays are utilized to promote the development of a child's learning skills.

In recent years the availability of inexpensive microprocessor technology and integrated circuits have made possible the creation of electronic interactive learning aids designed specifically for young children. Typically questions are posed to the child who must provide a proposed answer which is subsequently compared with the correct answer stored within the learning aid. The typical prior art learning aid thereafter provides the child with an indication of whether the proposed answer is correct.

Early prior art electronic learning aids incorporated small LED or LCD displays to communicate questions to the child and often utilized the same small display to indicate to the child if the child's proposed answer is correct. Such a prior art device is disclosed by U.S. Pat. No. 4,447,213. Other prior art devices relied upon lights or produced different audible tones to signify correct and incorrect responses. Prior art devices which sought to teach a child spelling often utilized external materials in the form of printed workbook containing pictures of common objects whereby the child was prompted to look at the workbook and spell the object pictured therein. More advanced prior art devices incorporated voice synthesizer technology to communicate to the child in a synthesized human voice, though some still utilized small alpha-numeric displays. Such a prior art device is disclosed by U.S. Pat. No. 4,516,260.

While some prior art devices have incorporated larger LCD displays, these and other prior art learning aids often lacked the ability to retain a child's attention for extended periods of time. Moreover, prior art educational devices typically lacked an effective means to communicate correct and incorrect answers to the child in a manner which reinforces the learning process in a graphic manner without repeating the same indication of correctness every time. Accordingly, prior art devices often fall into disuse due to their inability to maintain a child's curiousity and attention.

Accordingly, it is an object of the present invention to provide an electronic educational display system apparatus which is connectable to a standard television receiver for presenting large graphic displays to the child.

It is another object of the present invention to provide such an electronic educational video apparatus which presents a child with a pictorial representation and an associated request to input a proposed correct response wherein the pictorial representation is animated to provide an indication to the child of the correctness of the child's proposed correct response.

It is yet another object of the present invention to provide an educational device which captures and maintains a child's attention through the use of animated graphic displays appearing upon a standard television receiver.

It is still another object of the present invention to provide a plurality of interchangeable input devices through which a child may respond to a request supplied by the apparatus.

Another object of the present invention is to provide an electronic educational video system apparatus which includes a remote keyboard which communicates with a base unit by infra-red light signals.

Another object of the present invention is to teach a child spelling through the use of animated graphic video displays.

It is a further object of the present invention to teach a child musical skills by using animated graphics of visual displays.

These and other objects of the invention will become apparent in light of the present specification and drawings.

SUMMARY OF THE INVENTION

The present invention comprises an electronic video system apparatus for connection to a standard television receiver for teaching basic skills to a child through the use of graphic displays. The present invention specifically serves to motivate the child to utilize the apparatus and enhance the child's learning through the use of said graphic displays.

The electronic educational video system apparatus itself includes memory means for storing digital data corresponding to a plurality of pictorial representations, digital data corresponding to requests associated with said pictorial representations which direct the child to provide a proposed correct response. The memory means further stores digital data corresponding to the actual correct response to the requests associated with said pictorial representations. Display generation means are provided which are electrically connected to the memory means for generating digital video signals representative of the plurality of pictorial representations. Interface means electrically connected to the display generation means provide a video signal to the television receiver for displaying the pictorial representations and their associated requests for proposed correct responses.

The electronic educational video system apparatus further includes processor means which are electrically connected to the memory means and the display generation means wherein the processor means serves to select one of the pictorial representations which is stored in the memory means and causes that selected pictorial representation to be displayed upon the television receiver. The processor means also causes the particular request associated with the pictorial representation directing the child to provide a proposed direct response to be similarly displayed upon the television receiver.

A plurality of interchangeable input means are provided for permitting the child to provide a proposed correct response to the request presented on the television receiver. Means for comparing the child's proposed correct response with the actual correct response stored in the memory means are provided together with means for providing to the child an indication of the correctness of the childs proposed correct response.

In the preferred embodiment of the invention, the electronic educational video system apparatus further includes means for animating the displayed pictorial representation associated with the particular request for the proposed correct response which is presented to the child. The animation of the displayed pictorial representation serves to further provide the child with an indication of the correctness of said child's proposed correct response wherein, in the preferred embodiment, a unique pictorial representation is animated for each different request presented to the child. The preferred embodiment of the invention further includes sound generation means electrically connected to the processor means and the interface means for providing audio output signals to the child as a further indication of the correctness of the child's proposed response. These audio output signals generated by the sound generation means are heard by the child through the television receiver's audio speaker.

In one embodiment of the invention, the electronic educational video system apparatus further includes voice synthesis means which are operably and electrically connected to the processor means and the interface means for providing the requests for proposed correct responses, which are associated with the pictorial representations, to the child in synthesized human speech. The voice synthesis means further serves to provide the child with an indication of the correctness of the child's proposed correct response in synthesized human speech.

In another embodiment of the invention, the electronic educational video system apparatus further includes means for presenting to the child clues which serve to aid the child in determining the correct response to the presented request. These clues may be presented to the child by way of a graphic display appearing upon the television receiver or alternatively and/or additionally by way of the voice synthesis means whereby the child may hear said clue in synthesized human speech.

In the preferred embodiment of the invention, the memory means, display generation means, interface means, processor means, means for comparing and means for indicating the correctness of the proposed correct response are all contained within a first housing means. Additionally, the input means are preferably contained within a second housing means wherein the second housing means may be telescopically and removably received by the first housing means so as to permit the second housing means to be stored when not in use.

In the preferred embodiment of the invention, the input means for permitting the child to provide his or her proposed correct response comprises a plurality of interchangeable devices such as, for example, an alphanumeric keyboard, a touch-sensitive input pad or a mouse cursor control device wherein these various input devices may be interchanged with one another towards permitting the child to present the proposed correct response to the apparatus in the most convenient and expeditious manner. The electronic educational video system apparatus of the present invention additionally preferably incorporates input means which communicate with the processor means by way of an infra-red light wave signal which permits the input means to be operated by child at a position remote from the processor means and/or the television receiver. Such an arrangement obviates the need for any hardwire connection between any of the various interchangeable input devices and the processor means.

In the preferred embodiment of the invention the memory means comprises read-only-memory integrated circuit devices. Moreover, one embodiment of the invention further includes read-only-memory integrated circuit devices contained within cartridges which are electrically and removably connected to the processor means for storing additional digital data to enable the apparatus to display additional pictorial representations having correct responses associated therewith.

An additional embodiment of the present invention comprises an electronic educational video system apparatus for connection to a standard television receiver for teaching spelling skills to a child through the use of animated graphic displays wherein the animated graphic displays serve to motivate the child to utilize the apparatus and further enhance the child's learning. Memory means are provided for storing digital data corresponding to a plurality of unique pictorial representations of common objects, digital data corresponding to requests associated with each one of the unique pictorial representations which direct the child to provide the correct spelling of the unique pictorial representation. The memory means further store digital data corresponding to the correct spellings of each of the unique pictorial representations. Display generation means are provided which are electrically connected to the memory means for generating digital video signals representative of the plurality of unique pictorial representations. Interface means electrically connected to the display generation means provide a video signal to television receiver for displaying the pictorial representations upon the television receiver towards the display of said pictorial representations and their associated requests thereon.

Processor means electrically connected to the memory means and the display generation means select one of the unique pictorial representations which are stored in the memory means and cause the selected pictorial representation to be displayed upon the television receiver. The processor means further causes the associated request for the correct spelling to be presented to the child.

A plurality of interchangeable input means permit the child to provide a proposed correct spelling corresponding to the displayed pictorial representation. Means are provided for comparing the child's proposed correct spelling with the actual correct spelling of the displayed representation which is stored in the memory means. Means for animating the displayed pictorial representation provide the child with an indication of the correctness of the child's proposed correct spelling.

Another embodiment of the present invention comprises an electronic educational video system apparatus for connection to a standard television receiver for teaching music skills to a child through the use of animated graphic displays which serve to motivate the child to use the apparatus and enhance the child's learning. Memory means are provided for storing digital data corresponding to a pictorial representation of a musical keyboard and digital data corresponding to a plurality of musical notes. Display generation means electrically connected to the memory means generate digital video signals representative of the pictorial representation of the musical keyboard. Sound generation means are provided which are electrically connected to the memory means for generating digital audio signals which are representative of the plurality of musical notes. Interface means electrically connected to the display generation means and the sound generation means provide a combined video and audio signal to the television receiver for displaying on said receiver the pictorial representation of the musical keyboard and for playing said musical notes through said television receiver's audio speaker.

Input means for permitting the child to designate a plurality of musical notes which he or she desires to hear are provided. Processor means electrically connected to the memory means, the display generation means and the sound generation means cause the pictorial representation to be displayed upon the television receiver and further animate the displayed keyboard so as to simulate the movement of keys thereon in relation to the musical notes designated by the child upon the input means. The processor means further causes the sound generation means to generate digital audio signals representative of the particular musical notes designated by the child through the input means whereby the child is taught to associate specific musical notes with their respective position upon the keyboard by way of viewing upon the television receiver the movement of keys and their associated musical notes.

MODES OF OPERATION

The electronic educational video system apparatus of the present invention incorporates five basic modes of operation. The apparatus will display an activity selection menu from which the user may select one of the five main modes of operation which are identified as "MATH PROBLEMS," "WORD PROBLEMS," "WORD GAMES," "MUSICAL GAMES," "SUPER PAINTER" plus a "CARTRIDGE GAMES" mode for additionally available modes.

Consistent with the objects of the present invention, the apparatus incorporates use of a robot character which appears upon the television screen as a "teacher" serving to prompt or otherwise respond to the child's interaction with questions and/or requests provided to the child by the apparatus.

In the preferred embodiment of the invention, the electronic educational video system apparatus will, throughout the course of executing the various modes of operation, communicate with the child by way of written and/or graphic messages appearing upon the television screen, through musical or other tonal sounds and, through a synthesized human voice directed toward the user. In view of the ability to communicate with the user through written messages appearing on a television screen, the apparatus remains functional, and of beneficial use to the child, if sound and/or voice are disabled, for example in situations where such sound would disturb others, such as the child's parents.

MODE 1—MATH PROBLEMS

The first possible mode of operation of the present invention is referred to as "MATH PROBLEMS" and incorporates five activities having a progressive theme utilized to foster the teaching of math skills through the use of the robot teacher character—all in a game-like setting. The primary goal presented to the child is to advance the robot character from one activity through to the next activity. Advancing from one theme to the next is accomplished by correctly answering mathematical problems which are visually presented to the child on the television display. The mathematical problem presented to the child may be either addition, subtraction, multiplication or division type problems, or combinations thereof. The first menu presented to the child permits the child to chose among teaching, practice or competition modes of operation. In the teaching mode, mathematical problems are graphically presented to the child on the television receiver screen and the child is "led" through the method of solving such problems by the robot teacher character which appears on the television screen in combination with the problem displayed.

The practice mode of operation leads the child through the five theme activities. Each of the five theme activities incorporates the robot teacher which progresses from one theme activity to the next. In attempting to see the robot through its "journey" through each of the five activities, the child must correctly solve various mathematical problems. Accordingly, in its attempt to "play the game" and see the robot through each of the activities, the child learns and develops mathematical skills.

The competition mode is a two player mode which allows children to "race" against each other. Two robot characters, each of a different color, must navigate a "race course" where each player advances its respective robot character by correctly responding to mathematical problems. In operation, a mathematical problem is presented upon the television display screen and the player who first responds with a correct answer advances his respective robot character one step forward around the "race course".

In each of the foregoing teaching mode, practice mode and competition mode, the child may chose one of six levels of difficulty wherein each level of difficulty presents the child whith increasingly difficult mathematical problems. Moreover, the child may chose to concentrate on one specific type of mathematical problem, for example, addition, by selecting from an appropriate menu displayed upon the television screen.

MODE 2—WORK PROBLEMS

The second possible mode of operation of the present invention referred to as "WORD PROBLEMS" is divided into five activities wherein the child must respond to word related problems. The television screen displays a menu of five possible activities designated as "SPELLING 1," "SPELLING 2," "WHAT IS IT?," "WHICH IS THE ANSWER?," and "ANSWERING QUESTIONS," from which the child user is prompted to select one of said activities.

Selection of the first word problem activity, "SPELLING 1" causes the appartaus to generate a common object on the television screen and asks the child to input the missing letter which, when supplied by the child, completes the correct spelling of the pictured object.

Specifically, the apparatus will cause an object to appear upon the display screen accompanied by the spelling of that object wherein one of the letters is missing. The apparatus requests the child user to "fill in the missing letter" if a correct answer is provided by the child operator within three attempts, the child will hear a series of pleasant sounding notes and will see and hear the words "yes, you are right". In addition, a scoring display appearing upon the television receiver screen will be incrementally advanced for each correct answer. If the child user provides an incorrect response on the the first or second attempt, a series of unpleasant notes will be played and the child will see and hear the message "no, try again". If after three attempts the child is unable to provide the correct response the correct answer will appear in place of the question mark accompanied by the message "this is the correct answer". Moreover, each time the child provides a correct response, the robot teacher character will become animated nodding and saying "yes". Each time an incorrect answer is supplied, the robot teacher character will become animated shaking its head and saying "no". An additional feature of this activity, permits the child user to depress the "help" key which will cause clues, in the form of three letters to appear on the display, one of which letters is the correct response. The user may then select one of the possible choices as his response. Periodically through the course of engaging this activity, the child user will see the display indicating the score achieved and will be provided with an evaluation of the performance through such comments as "you need more practice," "good going," or "excellent," subject to the score obtained.

In the two-player mode of operation, two children may compete against one another in playing the "SPELLING 1" activity. The apparatus will continually display a score for player one and another score for player two accompanied by a timer display. The apparatus will prompt the first player to commence play and will cause the timer to count down. If the first player is unable to answer within the time allowed or enters an incorrect answer, an unpleasant series of notes will sound, the robot teacher character will turn its head and say "no" and the display "time is up for player one, player two's turn" or "no, player two's turn" will appear signaling player two to commence play. If neither player can provide the correct answer, the robot teacher will provide the correct answer by saying "this is the correct answer" accompanied by the correct answer appearing on the television receiver screen. Periodically throughout the course of play, player one's score will be displayed accompanied by an evaluation of his or her performance similar to that in the one-player mode, followed by the display and evaluation of player two's score.

The "SPELLING 2" activity operates identically to the spelling one activity except that more difficult words are supplied to the child operator.

The third possible activity within the word problems mode is designated "HOW DO YOU SPELL IT?". In this mode of operation the child user is presented with a display containing common objects. The child will be prompted to provide the correct spelling of the common object pictured. For example, the child may be provided with a display of a farm scene in which various farm animals appear. Upon completion of the display, the child will prompted to provide the proper spelling of a pictured object by the apparatus having displayed a question mark overlapping one of the particular farm animals followed by the textual display of the words "how do you spell it?" and audio generation/presentation of that same message. Accompanying this request is the presentation of a plurality of blanks corresponding in number to the number of letters contained in the correct spelling of the particular selected object. The child is thus prompted to input upon the keyboard the correct spelling of the object pictured, for example, a horse. In such a case, five blank lines would appear upon the display accompanied by a question mark overlapping the pictured horse on the television receiver screen. If the student supplies the letters h, o, r, s, e in the correct order, the message "yes, you are right" will be displayed as well as heard by the user and the horse will become animated reinforcing that the child has supplied the correct answer. If an incorrect answer is supplied by the child, a series of unpleasant notes will be heard and the message "no, try again" will be both seen and heard by the child. If after three attempts, the child is unable to supply the correct answer, the message "this is the correct answer" will be both seen and heard followed by the correct letters appearing in the blanks supplied. As an additional feature, the child may press the "help" which will cause the first and last letter of the object's spelling to be displayed upon the television receiver screen. Thereafter, only a single attempt to provide the correct answer is allowed. For each correct answer, a score is incrementally advanced upon the display. After having attempted to respond to a predetermined number of objects, the child will both hear and see the message "your score is —" accompanied by an evaluation such as "good going" or "excellent" subject to the score obtained. As part of this mode of operation, correct answers will cause the object to be spelled to become animated to thereby cause the child to desire to "play the game" and thus learn.

In the two-player mode of activity three, "HOW DO YOU SPELL IT?" the television receiver screen includes displays of player one's score player two's score and a timer and operates similarly to the two-player mode of activities one and two wherein the first player must provide a correct answer within a displayed time and if that player is unable to correctly answer within said time, player two is given the opportunity to respond and accordingly advance his score.

Upon selection of activity four, designated "WHICH IS THE ANSWER?," the apparatus will cause the television receiver to display a plurality of objects accompanied by a logical sentence with a word missing. The child is prompted to supply the word which logically completes the sentence displayed. For example, the child may be presented with a display which includes a figure of a boy, a window, a dog, and a ball. The child will then see a "fill-in-blank question" accompanied by three possible answers on the television screen. Specifically, "the boy —his head". The child will both see and hear the message "what is the answer?". One of the figures will then become animated thereby supplying the child with the prompt for the correct question.

In one example, the boy figure may begin turning his head indicating that the child should supply the response "turns". In another example, the ball may roll across the display screen indicating to the child he or she should supply the answer "rolls". In still another example, the boy figure may be pictured standing adjacent to a window wherein the child will see the message "the boy stands —a window" accompanied by three choices, "near," "above," "below". In such an example, the child would properly respond by typing the word "near".

As in the preceding activities, the child will both hear and see the message "yes, you are right" for correct answers and "no, try again" for wrong answers. Additionally, after three wrong answers, the child will hear and see "this is the correct answer" accompanied by the correct answer appearing in the blank. Similarly, after responding to twenty questions, the apparatus will provide the user with an indication of the score obtained to that point and an evaluation of the user's performance by displaying and saying such messages as "good going" or "you need more practice," subject to the score obtained. Moreover, a combination of pleasant and unpleasant sounding music will accompany correct and incorrect responses, respectively.

The fifth activity is designated "ANSWERING QUESTIONS" wherein the user is prompted to answer questions which are related to the theme of a particular display. For example, the child may be presented with a picture of a group of objects which are each associated with a particular season. For example, one display may contain a snowman and the child will be asked to identify the corresponding season of the year. The child is thus expected to supply the answer "winter". The object of this activity is to teach the child to identify, for example, seasons, with the appearance of different objects, and in general to develop logic and associational skills.

MODE 3—WORD GAMES

The third mode of operation of the electronic educational video system apparatus is designated "WORD GAMES" and includes three different activities namely, "WORD ZAPPER," "SCRAMBLE," and "WORD SEARCH," wherein each of the activities, may be played in either a one- or two-player mode. The selection of a particular activity and player mode are accomplished through menus which visually and audially prompt the child to make the appropriate selection.

The first activity is designated "WORD ZAPPER" and corresponds to the game commonly known as "hangman". In this activity, the child is presented with a display in which appear the robot teacher character together with a number of blanks corresponding to the number of letters in the word to be guessed. The child sees and hears the message "guess the letter" thereby prompting the child to input a letter. If the child inputs a letter which appears in the "mystery word" the letter will be placed in place of one of the blanks and the child will see and hear the message "yes, you are right". However, if the letter guessed is not contained within the "mystery word" the child will hear a series of unpleasant notes. In addition, other objects on the display will become animated to indicate right or wrong responses. Moreover, if an incorrect answer is given by the child, one of the body parts of the robot teacher character will lose its color with only the outline of, for example, an arm remaining. If the child is able to guess all of the letters of the word before only an outline of the robot character remains, the child will have won and pleasant music and animation will appear. If however, only the outline of the robot character appears and the child is unable to supply the correct letters, the child will hear unpleasant music and the word "no" accompanied by animation, such as smoke appearing from a spaceship pictorial in the display.

The second activity in the WORD GAME mode of operation is designated "SCRAMBLE" wherein the child must unscramble a series of letters to form the proper word. In this particular activity the display on a television receiver screen comprises a spaceship-like control panel and a window looking into space. In operation, a "spaceship" will move in animation across the "sky" depositing the letter in a randomly arranged order. A corresponding number of dashes will thereafter appear upon a "display panel" in the "control panel". The student will then then be prompted to unscramble the word appearing in the "sky" by hearing and seeing the message "rearrange the letters". A timer indicator will visually change signifying the time in which the user must unscramble the letters. If the child correctly unscrambles the word, he will here and see the message, "yes, you are right" and various gauges and dials appearing on the display will become animated.

If the student is unable to supply the correct answer within the time limit, he or she will hear a series of unpleasant notes and will see and hear the display message "no, try again" and his or her incorrectly supplied answer will be erased. If the user child is unable again to properly unscramble the letters, the "spaceship" will, in animation, move across the screen overlapping the scrambled letters and descramble the letters and the student will see and hear the message "this is the correct answer". Periodically throughout the course of play, the student will hear and see a message indicating the score obtained to that point and providing a evaluation of that score through such messages and "good going" or "excellent," subject to the score obtained.

Activity three of the WORD GAMES mode of operation is designated "WORD SEARCH". In this mode of operation, the child is prompted to locate the correct spelling of a word from, within, a group of letters arranged in matrix form. Moreover, the word to be spelled is identified by the graphic representation of that object upon the television display. For example, the child may see upon the television receiver screen a display of a matrix of letters accompanied by the robot teaching character. The object to be spelled and found from within the matrix will be displayed upon the screen. For example, the user may see the picture of an apple accompanied by the message "search the word". The student child would thereafter have to locate the letters a, p, p, l, e within the matrix of letters by use of a cursor control on the keyboard so as to identify the spelling of the word apple. Correct and incorrect responses are responded to by way of animation of the robot character, the playing of pleasant or unpleasant music and the hearing and seeing of messages "yes, you are right" or "no, try again," respectively. If the child is unable to locate the letters corresponding to the pictured object, within the period of time or number of attempts allowed, the apparatus will cause the student to hear and see the message "this is the correct answer" and the correct letters will be highlighted within the letter matrix.

For each of the activities within the WORD GAME mode of operation, the child may select between a one- and two-player mode which corresponds to similar modes within the WORD PROBLEM option.

MODE FOUR—MUSICAL GAMES

The fourth mode of operation of the electronic educational video system apparatus is designated "MUSICAL GAMES" and consists of four separate activities identified as "MEMORY TONE," "DEMO-SONG," "LEARN A SONG" and "FOLLOW ME". As in the other modes of operation, the child selects from a menu displayed upon the television receiver screen the activity he or she wishes to use. In the first activity, MEMORY TONE, the apparatus causes an animated keyboard to appear upon the television receiver screen accompanied by the robot teaching character. The child may then press notes, e.g., "do," "re" etc. and the apparatus will generate a musical sound corresponding to the key(s) depressed by the child. At the same time, the robot teacher character will move in animation jumping from a starting position to the keys depressed by the student in order, thereby identifying which key corresponds to which "note" selected and heard by the child. In addition, the child will see the note displayed upon the television screen. After having selected the desired musical notes, the user may depress a "play" key and the apparatus will, in sequence, replay the notes corresponding to the keys depressed by child.

In the second activity, designated "DEMO-SONG," the child may select one of ten predetermined songs which appear upon the television screen. After selecting a song the child will see an animated display of animated figures each of which corresponds to a plurality of notes. As the apparatus plays the selected song, the various figures appearing upon the display will become animated jumping and opening their mouths as if "sounding" the note.

The third activity in this mode of operation is designated "LEARN-A-SONG". This activity incorporates a display similar to the "DEMO-SONG" activity, however, the child will see the animation of a particular character and will hear the notes sounded by that character and is thus prompted to identify that note by depressing the correct corresponding key of the keyboard on the input device.

The fourth activity in the musical games mode of operation is designated "FOLLOW ME". In this activity, the user is presented with an animated display of a "spaceship" having windows in which are displayed the various musical notes. The various notes will be prompted by highlighting or changing the color of the particular window corresponding to that note thereby prompting the student to depress the key corresponding thereto on the keyboard. Simultaneously, the note corresponding to that in the "window" will be generated through the television receiver. If the child correctly depresses the note on the keyboard corresponding to the note identified on the display and heard through the television receiver, the apparatus will thereafter repeat that same note plus an additional note thereby prompting the student user child to identify both notes. The apparatus will continue to add additional notes to those already played and identified by the user so long the child correctly inputs each of the notes in sequence. If the child improperly identifies a note displayed and sounded, he will hear and see the message "no, try again" until properly identifying on the keyboard the note heard and seen.

MODE FIVE—SUPER PAINTER

The fifth mode of operation of the electronic educational video system apparatus designated "SUPER PAINTER" comprises what may be described as an electronic coloring book. In operation, the child is presented with a display appearing upon television receiver screen which comprises a series of commands, color menu with 14 selectable colors, an object library, and a drawing area. The commands comprise pictorial icons corresponding to various commands. For example, a pencil corresponds to the command to draw a fine line whereas a crayon icon corresponds to the command to draw a broader line. The color menu comprises a plurality of color squares which when selected will cause that color to be used in drawing and/or filling regions in the drawing region. The object library comprises a plurality of symbolic icons which correspond to predrawn objects contained within an "electronic" library which may be selected by the child to cause a completed object, such as a car, to appear in the drawing region merely by selecting that particular object. In operation, the child makes use of the cursor controls on the keyboard or alternately, the mouse cursor control input device or touch pad input device, to select the various commands, colors and objects towards drawing either in free style or in predetermined geometric shapes objects within the drawing region.

MODE SIX—CARTRIDGES

The sixth mode of operation of the video system apparatus is designated "CARTRIDGES". Upon selection of this mode the child will be presented with a menu which indicates additional activities, if any, which may be selected by the child, contained within removable cartridges insertable into the apparatus.

DETAILED DESCRIPTION OF THE DRAWINGS

While this invention is susceptible of embodiment in many different forms, there is shown in the drawings and will herein be described in detail, several specific embodiments, with the understanding that the present disclosure is to be considered as an exemplification of the principals of the invention and is not intended to limit the invention to the embodiments illustrated.

Figure 1:
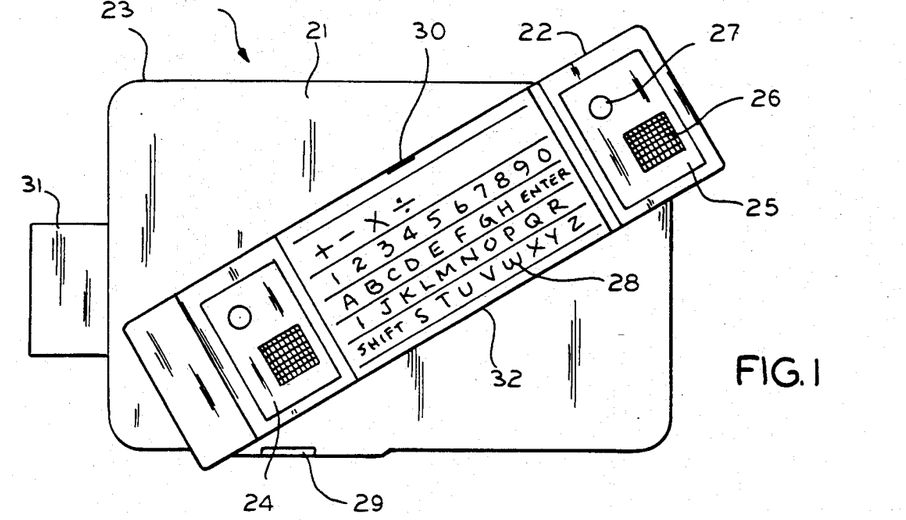
FIG. 1 of the drawings is a top plan view of the present electronic educational video system apparatus illustrating the base unit having disposed thereon the remote keyboard unit and asssociated cursor control units and further illustrating the insertion of a ROM cartridge.

Electronic educational video system apparatus 20 is shown in FIG. 1 in its assembled position, with keyboard housing 22 operably disposed upon the top surface 21 of base unit 23. Keyboard housing 22 is shown comprising keyboard 32, left cursor control 24 and right cursor control 25, all contained within keyboard housing 22. Curser controls 24 and 25 are shown comprising cursor control key 26 and button 27. Base unit 23 is further shown including infra-red signal receiver port 29. Additionally ROM cartridge 31 is shown operably inserted into base unit 23.

Figure 2:
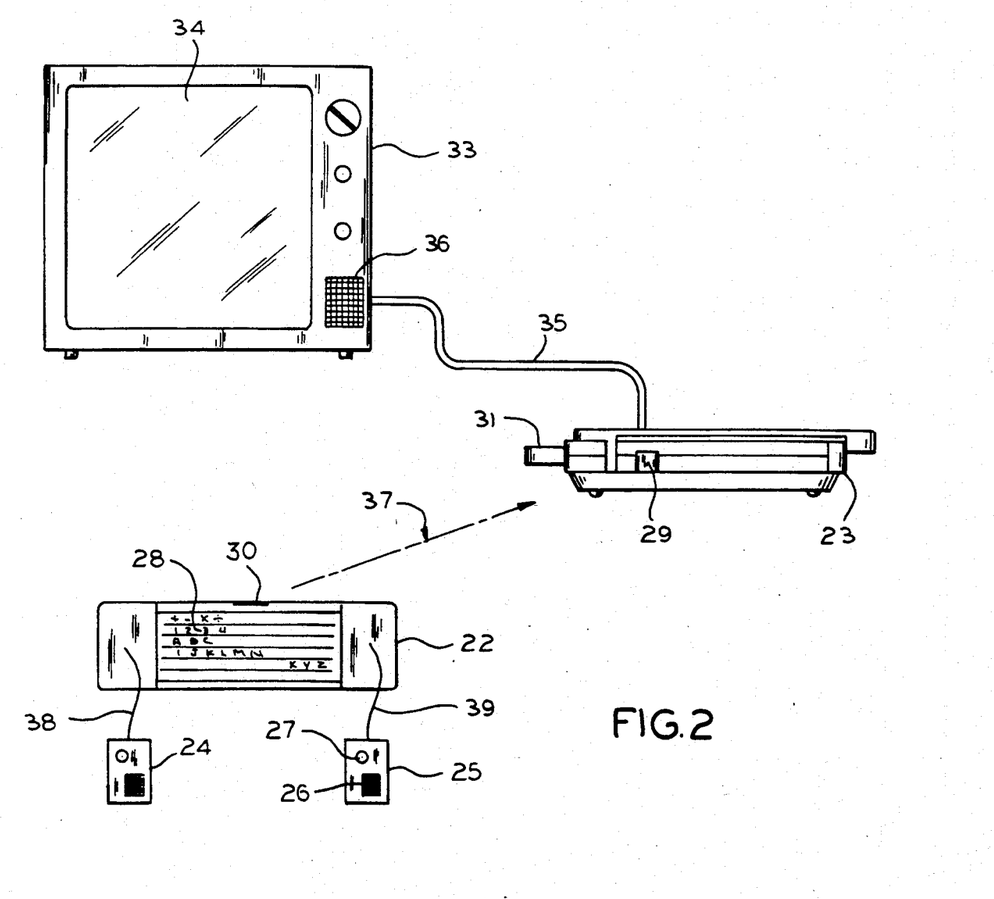
FIG. 2 of the drawings is a schematic view of the present invention specifically illustrating the connection of the base unit to a standard television receiver, further illustrating the remote placement of the keyboard unit with its cursor controls detached.

FIG. 2 provides an illustration of the connection of the electronic educational game apparatus 20 to a standard television receiver 33. Base unit 23 is shown with keyboard housing 22 removed therefrom. Base unit 23 is operably connected to television receiver 33 by way of cable 35 which connects with the antenna input (not shown) of television receiver 33. Television receiver 33 is specifically shown as comprising screen 34 and speaker 36.

In operation, keyboard housing 22 and keyboard 32 are not physically attached to base unit 23 but rather communicate with base unit 23 by way of an infra-red signal, designated 37. Accordingly, in operation, base unit 23 may be positioned adjacent to television receiver 33 such that keyboard housing 22 may be positioned remote therefrom. Keyboard 32 is shown as comprising a membrane keyboard bearing indicia 28 thereon. Indicia 28 include the letters of the alphabet, numbers 0 through 9 and mathematical operators. (FIG. 1) Moreover, left cursor control 24 and right cursor control 25 are shown removed from keyboard housing 22, so as to enable two players to utilize the keyboard cursor control units at a greater distance from one another. Left cursor control unit 24 is shown operably attached to keyboard housing 22, and the circuitry contained therein, (not shown) by wire 38 whereas right cursor control unit 25 is shown connected to keyboard housing 22 by wire 39. Moreover, keyboard housing 22 is shown as including infra-red output port 30 which, in operation of the device, is directed toward infra-red receiver port 29 upon base unit 23. Of course, keyboard unit 22 could be operably attached to base unit 23 by a hard-wire connection.

Figure 3:
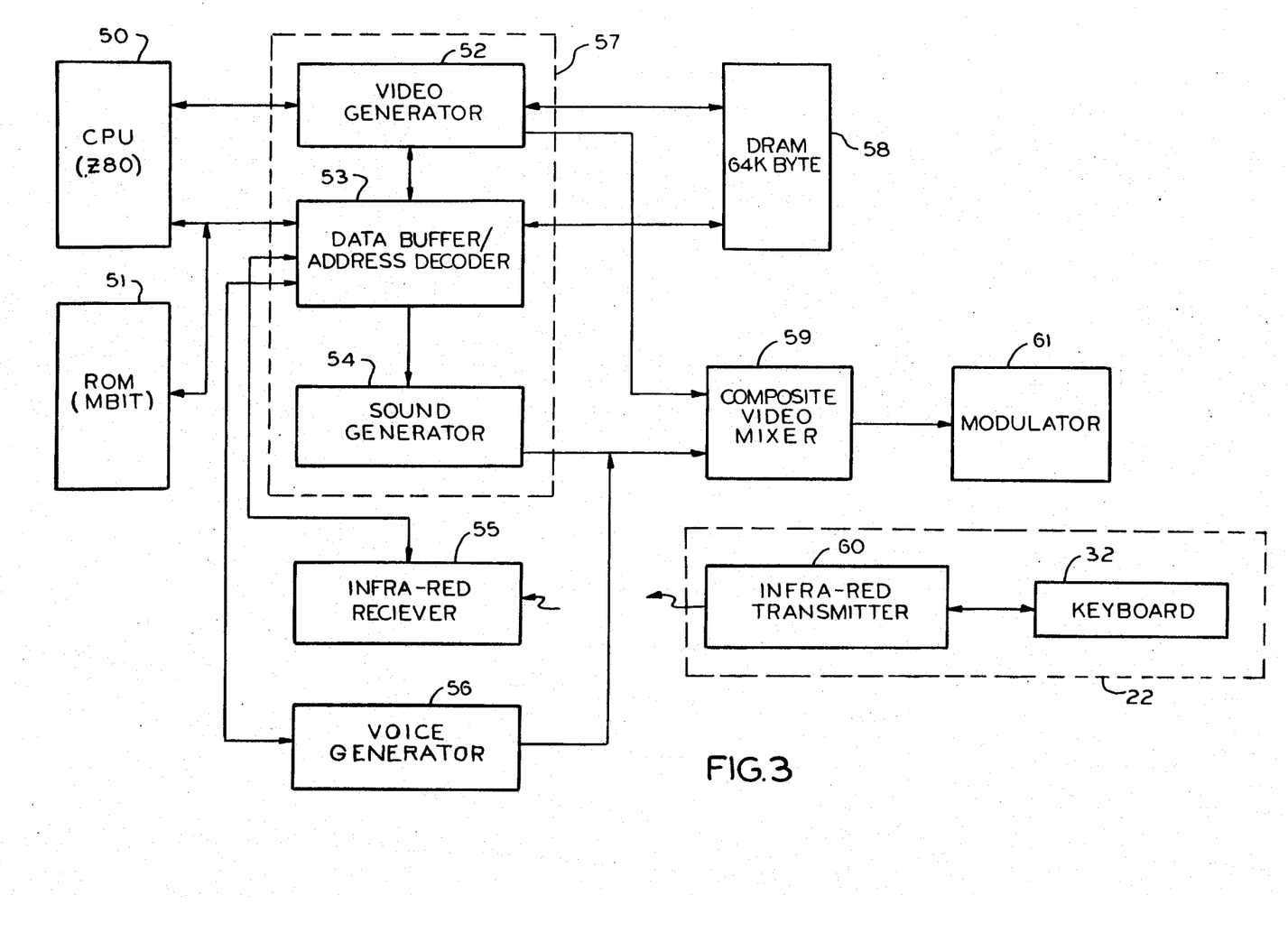
FIG. 3 of the drawings is a block diagram of the electronic circuitry of the present electronic educational video system apparatus.

FIG. 3 of the drawings illustrates a block diagram of the electrical components of the present electronic educational video system apparatus. Central processing unit CPU 50 is shown connected to integrated circuit 57. In the preferred embodiment of the invention, CPU 50 comprises a Z80 microprocessor integrated circuit. Read-only-memory, ROM 51, is shown connected to CPU 50 and data buffers/address encoder 53. In the preferred embodiment of the invention ROM 51 comprises two megabytes of read-only-memory. Contained within ROM 51 are the computer software programs which generate the video displays, sound presentation, voice presentation, and other control signals necessary for generating video displays and audio sounds to the television receiver 33 and thus the user. Moreover, ROM 51 contains, in digital form, the various questions which are presented to the child and the correct responses to those questions, as well as digital data necessary for animating the various displays presented upon the television screen 34.

Integrated circuit 57 is specifically shown as comprising video generator 52, data buffer/address decoder 53 and sound generator 54. Operably associated with, and connected to, integrated circuit 57, and thus CPU 50, is random-access-memory 58. Random-access-memory 58 preferably comprises 64 kilobytes of digital memory. Operably associated with data buffer/address decoder 53 is infra-red receiver 55. Infra-red receiver 55 serves to accept the infra-red signal from keyboard 32 thereby transmitting the child's input to the apparatus 20.

Voice generator 56 is shown operably connected to data buffer/address decoder 53 and to composite video mixer 59. Voice generator 56 produces synthesized human speech as directed by CPU 50 and the computer programs contained within ROM 51.

Composite video mixer 59 is shown operably connected to voice generator 56, sound generator 54 and video generator 52. Composite video mixer 59 serves to combine the voice, sound and video signals towards their transmittal and eventual representation upon television receiver 33. Specifically, composite video mixer 59 is operably attached to modulator 61 which converts said signals into a radio frequency format which is suitable for connection to the antenna input of television receiver 33.

Infra-red transmitter 60 and keyboard 32 are contained within keyboard housing 22. Infra-red transmitter 60 serves to transmit an infra-red signal to infra-red receiver 55 wherein said signals correspond to keys on keyboard 32 which are depressed as input responses by the child.

Figure 4:
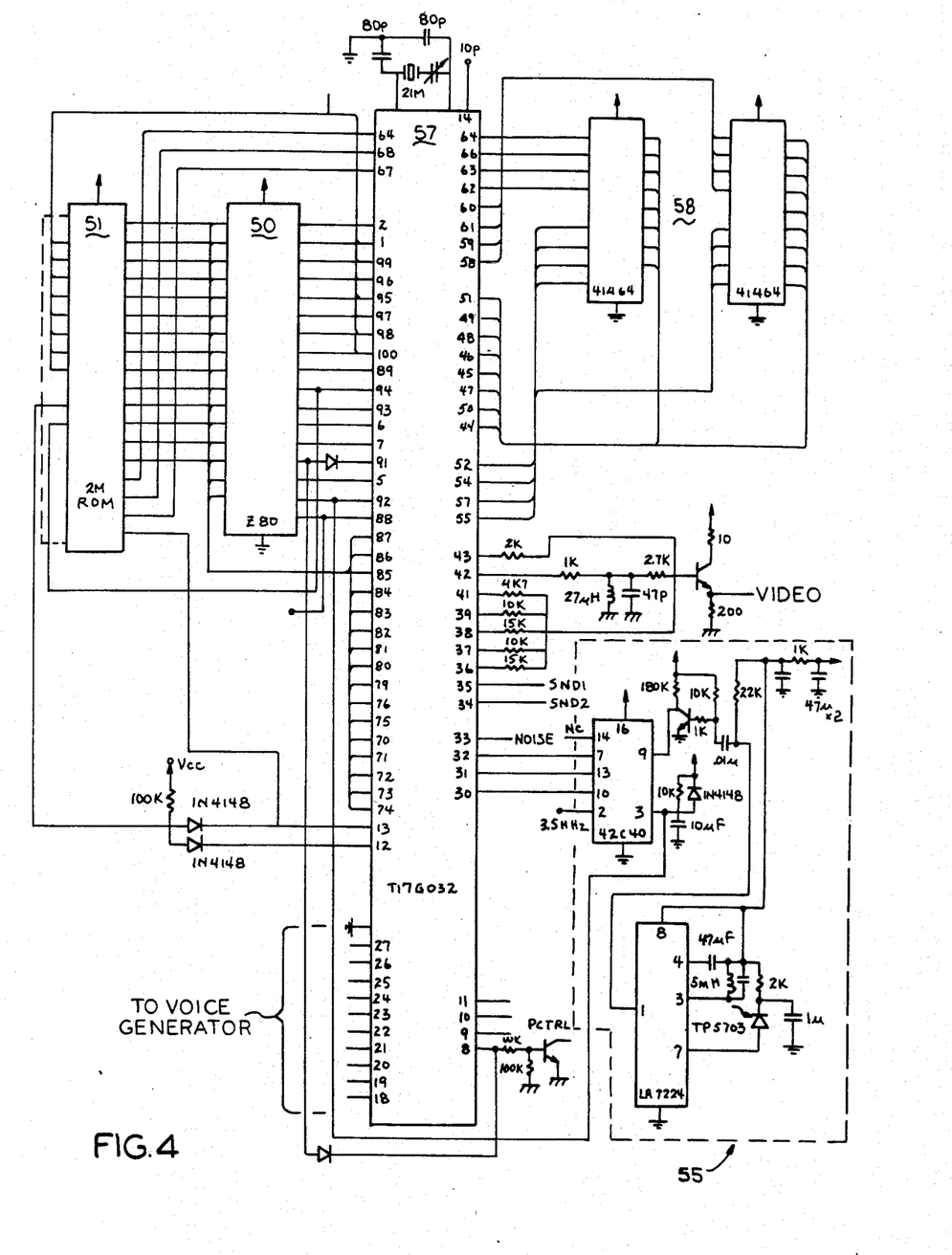
FIG. 4 of the drawings is a schematic diagram of the electronic circuitry contained within the electronic educational video system apparatus.

FIG. 4 of the drawings specifically illustrates the connection of ROM 51 to CPU 50. CPU 50 is, in turn, shown connected to integrated circuit 57. Random access memory 58 is shown operably connected to integrated circuit 57 and infra-red receiver 55 is additionally shown operably and electrically connected to integrated circuit 57.

Figure 5:
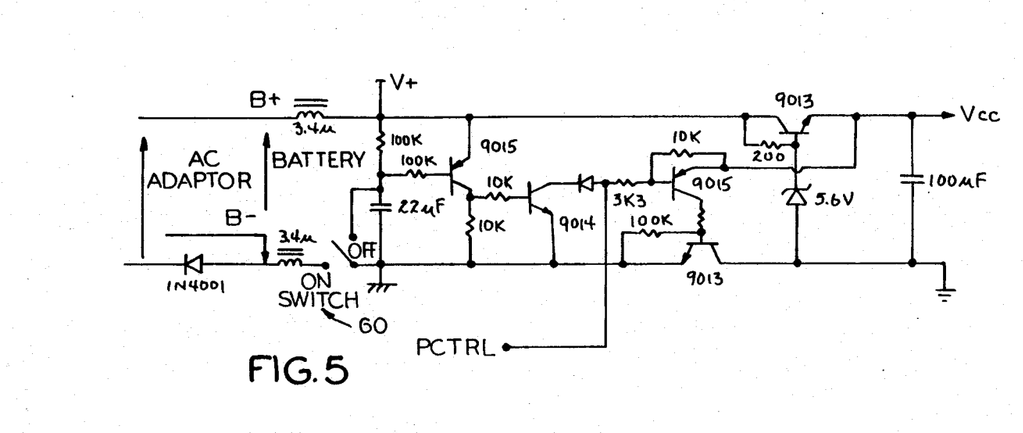
FIG. 5 of the drawings is a schematic diagram of the power control circuitry of the present apparatus.

FIG. 5 of the drawings discloses and illustrates the power conditioning circuitry for the present electronic educational video system apparatus. All applicable electronic element values including, on/off switch 60 are listed and the circuit's operation should be readily understandable by those skilled in the art.

Figure 6:
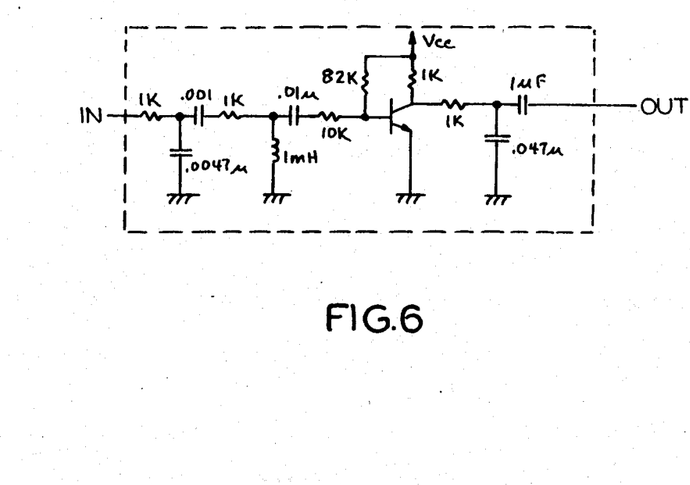
FIG. 6 of the drawings is a schematic diagram of the noise filter circuitry utilized in the present invention.
Figure 7:
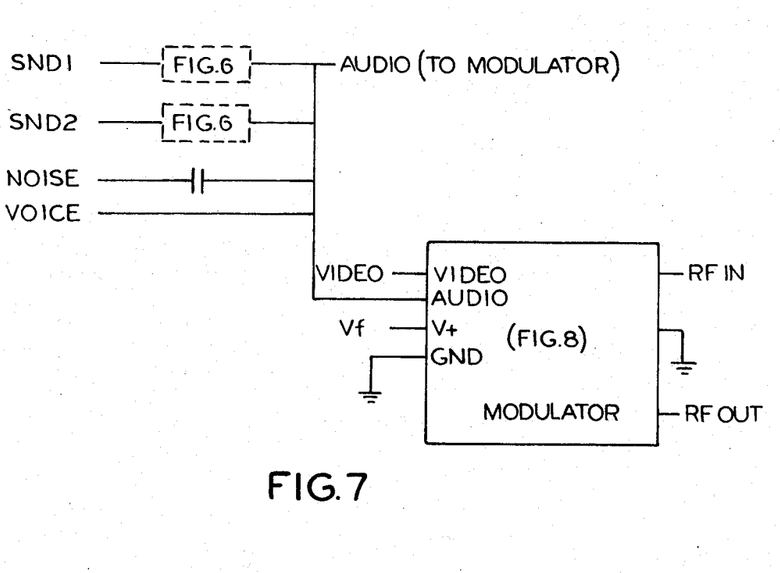
FIG. 7 of the drawings is a schematic diagram of the audio and video mixing circuitry of the present invention.
Figure 8:
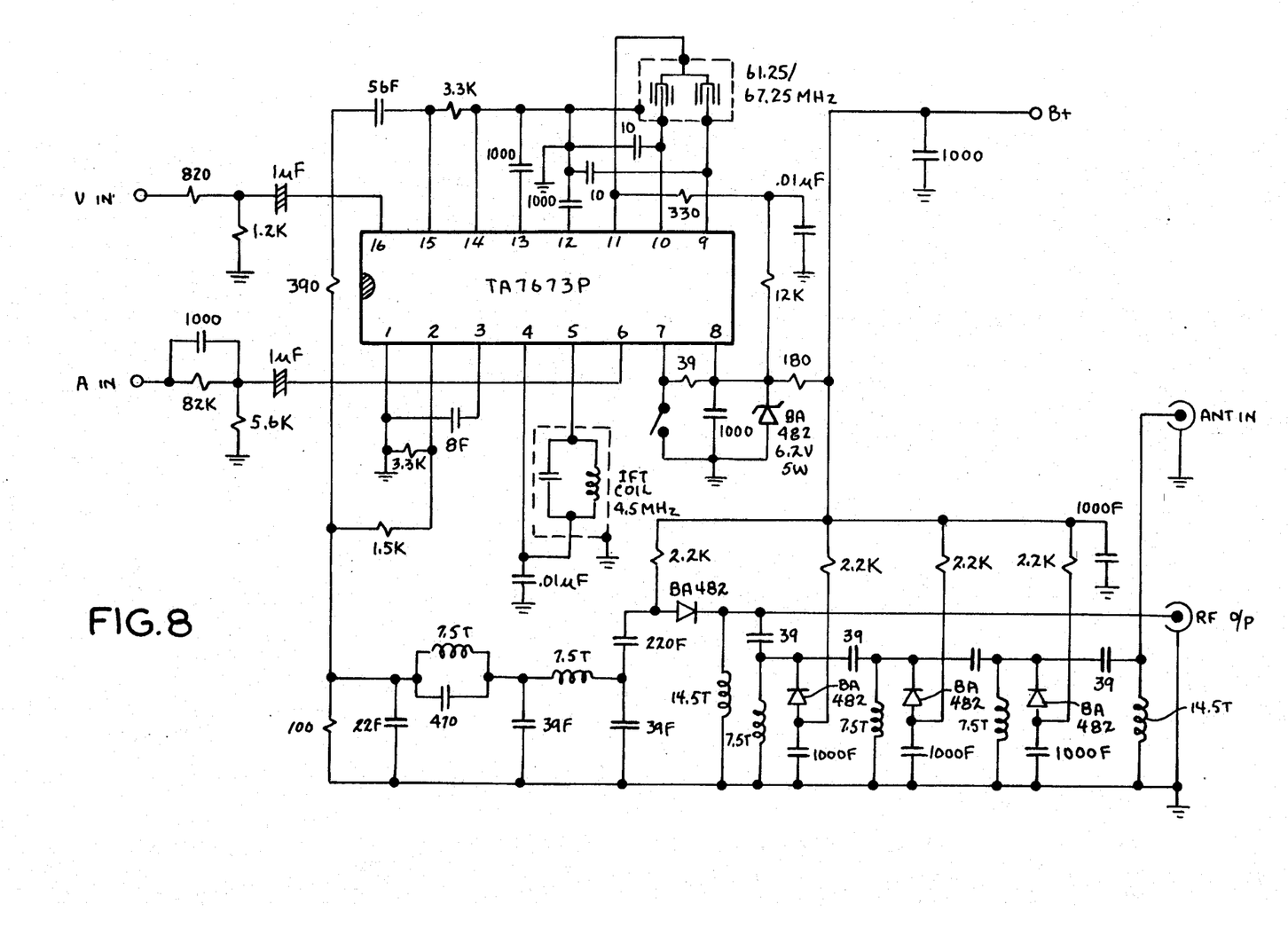
FIG. 8 of the drawings is a schematic diagram of the radio frequency modulator circuitry as shown in FIG. 7.

FIG. 7 of the drawings illustrates the circuitry arrangement for combining the audio signals and video signals generated on FIG. 4 and towards modulating said signals into a radio frequency output adaptable for attachment to the antenna input of said television receiver 33. Specifically, FIG. 6 of the drawings illustrates a recognizable noise filter circuit while FIG. 8 of the drawings illustrates the modulation circuitry. All component values are provided and should similarly be readily understandable by those skilled in the art.

Figure 9:
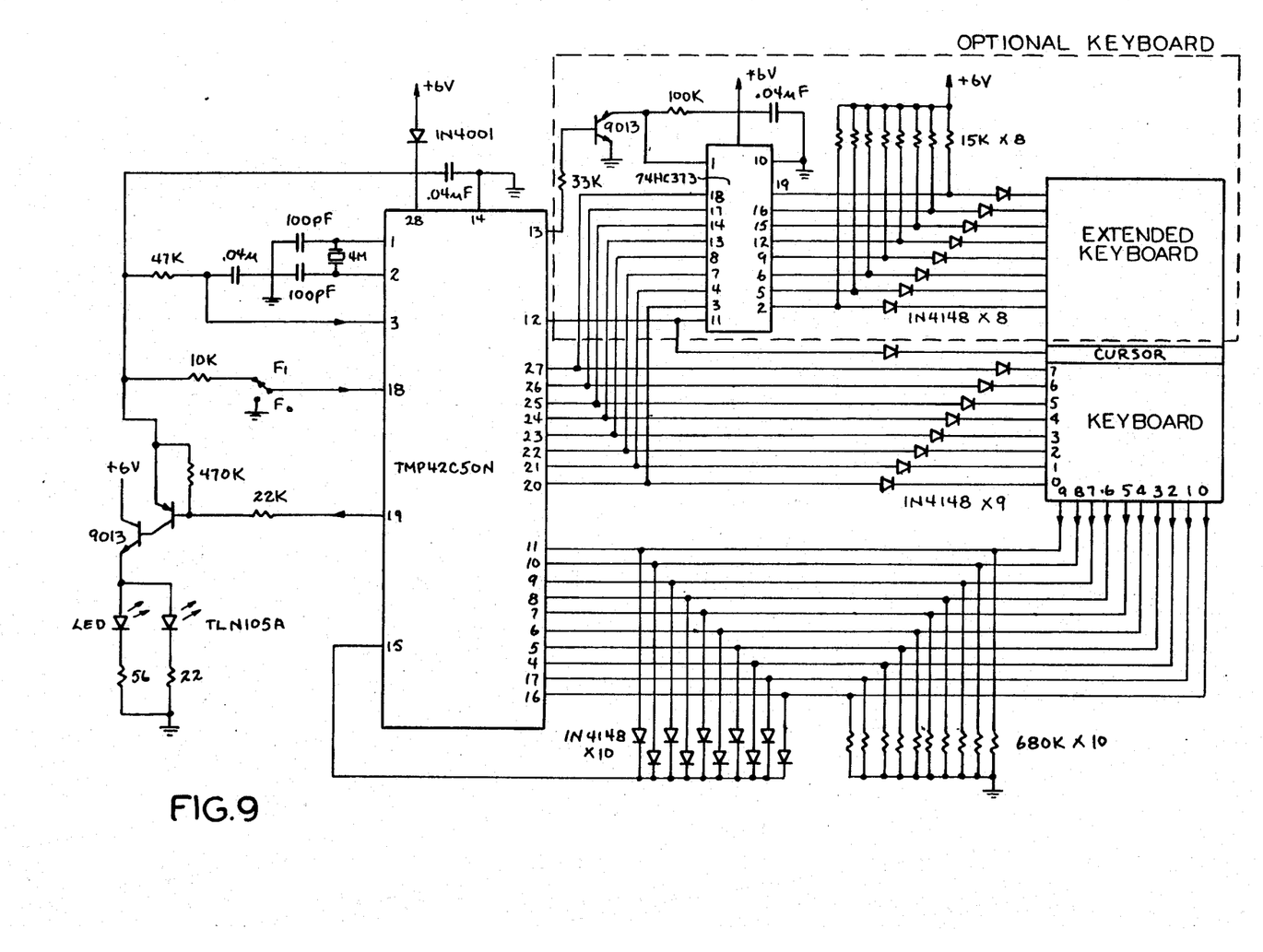
FIG. 9 of the drawings is a schematic diagram of the electronic circuitry contained within the remote keyboard unit.

FIG. 9 of the drawings illustrates the keyboard and cursor control circuitry and infra-red transmission circuitry associated therewith.

Figure 10:
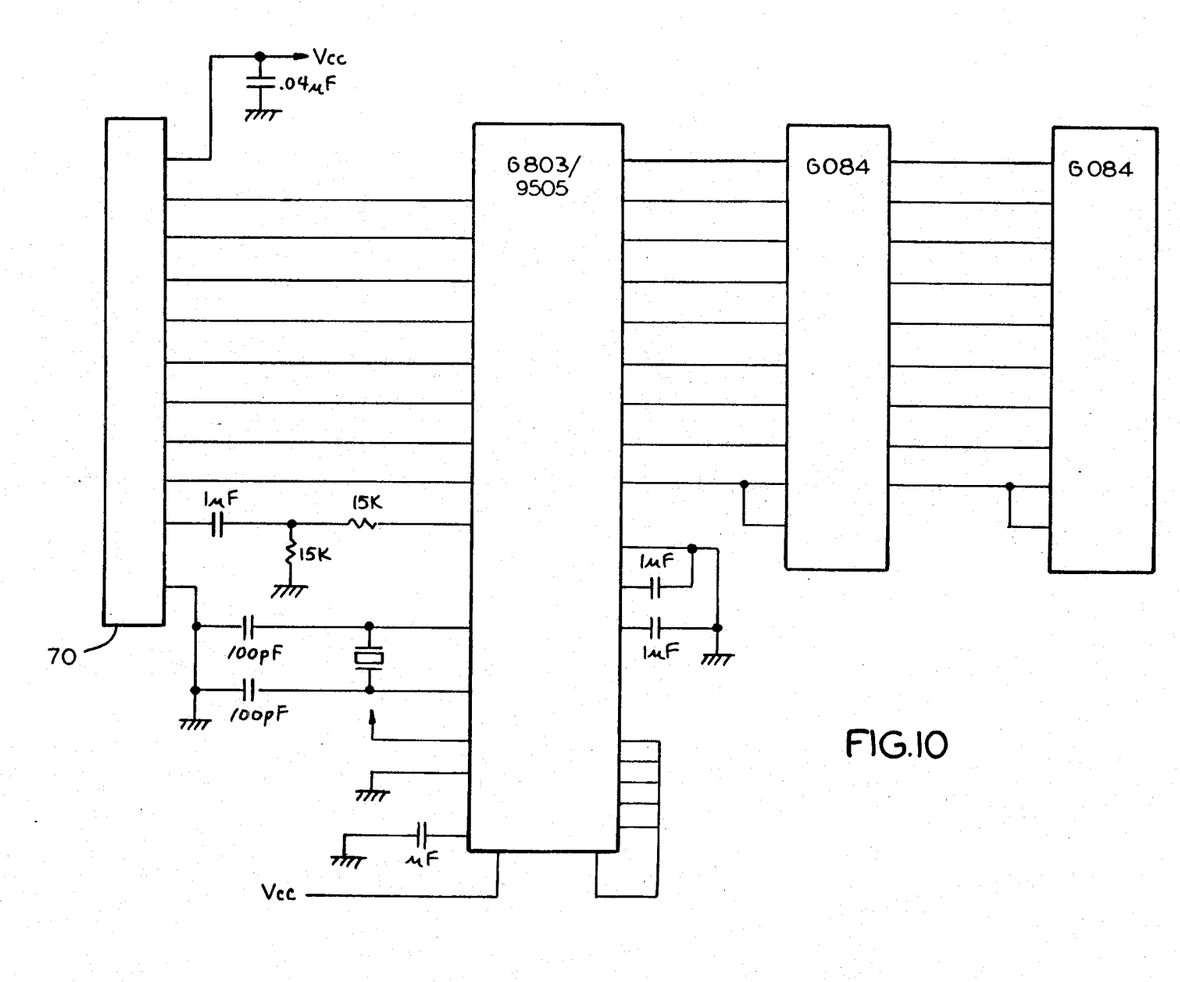
FIG. 10 of the drawings is a schematic diagram of the voice synthesizer generation circuitry.

FIG. 10 of the drawings is a schematic diagram of the voice generation circuitry which is based upon a type 6803/9505 voice synthesis chip connected in a known manner. Block 70 connects the voice generation circuit to the main circuitry illustrated in FIG. 4.

Figure 11:
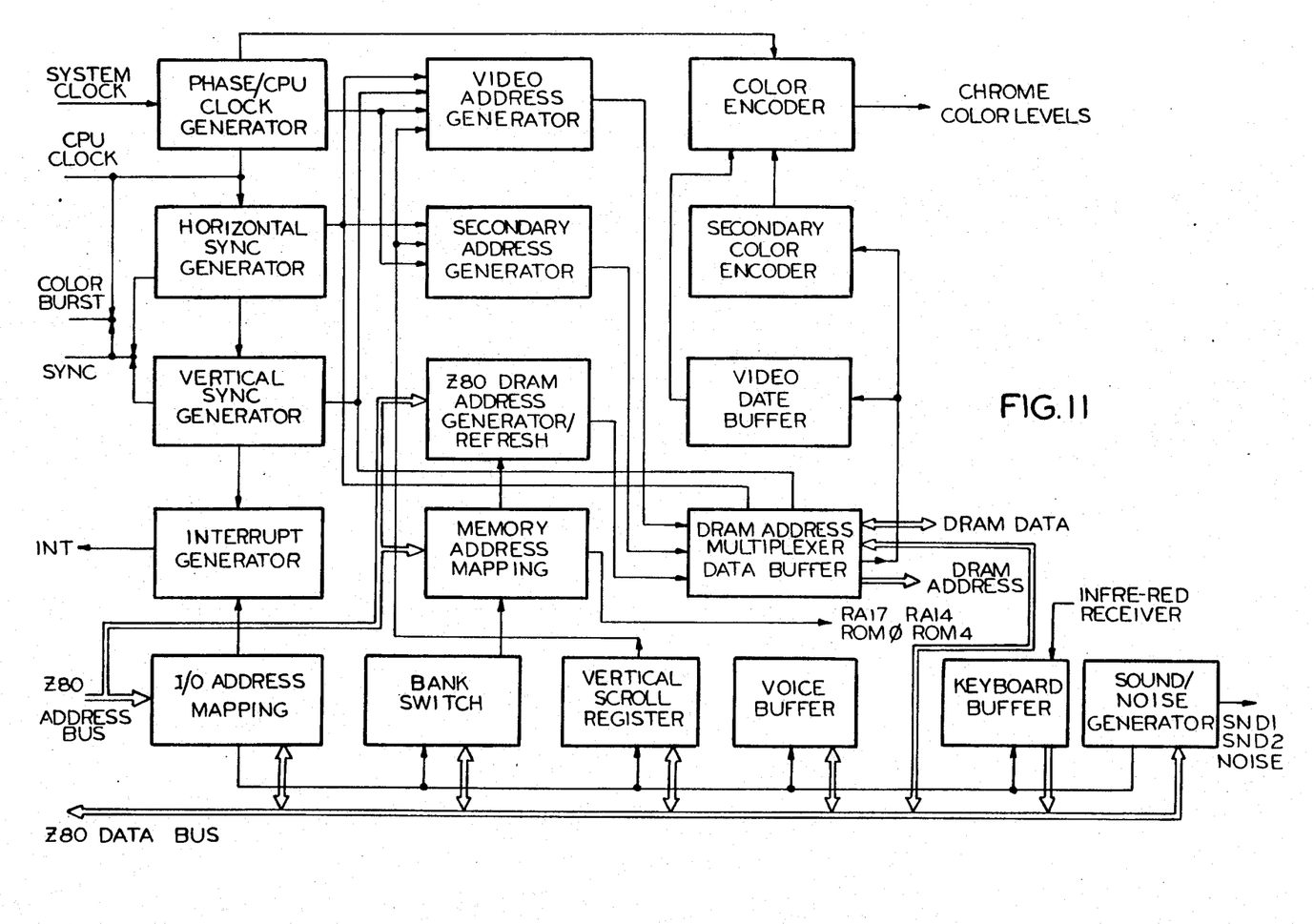
FIG. 11 of the drawings is a block diagram of the intergrated circuit 57 shown in FIG. 4 of the drawings.

FIG. 11 of the drawings is block diagram of the video display generation, audio display generation and memory and CPU interface and controller circuitry and contained in integrated circuit on 57 shown on FIG. 4.

Figure 12:
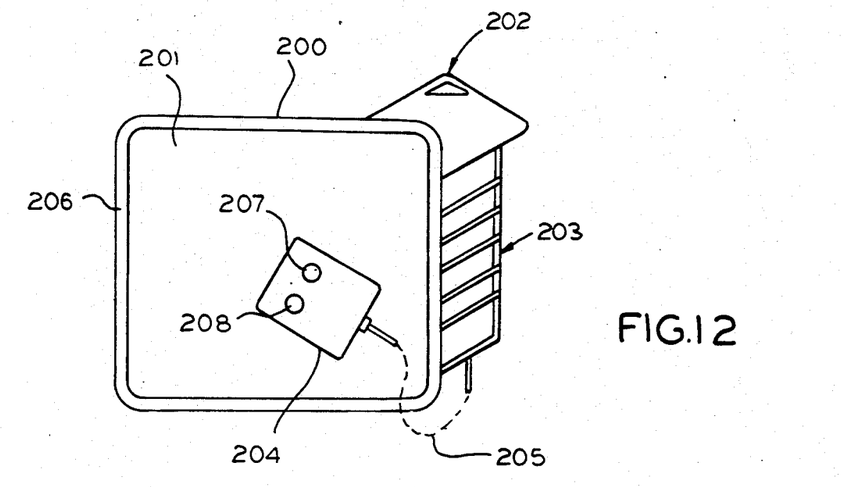
FIG. 12 of the drawings is a top plan view of the mouse input device for use in association with the present invention.

FIG. 12 shows remote input device 200 which comprises a mouse 204 and table 201 assembly. Specifically, remote input device 200 communicates with base unit 23 in a manner similar to keyboard 32 in that remote input device 200 relies upon an utilizes infra-red transmitter circuitry contained within housing 206. In operation, remote input device 200 is aligned to as to direct infra-red transmitter port 202 in the direction of base unit 23 and specifically infra-red receiver port 29. Mouse unit 204 is shown connected to housing 206 via wire 205. Mouse unit 204 further includes buttons 207 and 208. In operation, mouse and table combination 204 and 201 respectively may replace cursor control and button unit 24 and/or 25.

Figure 13:
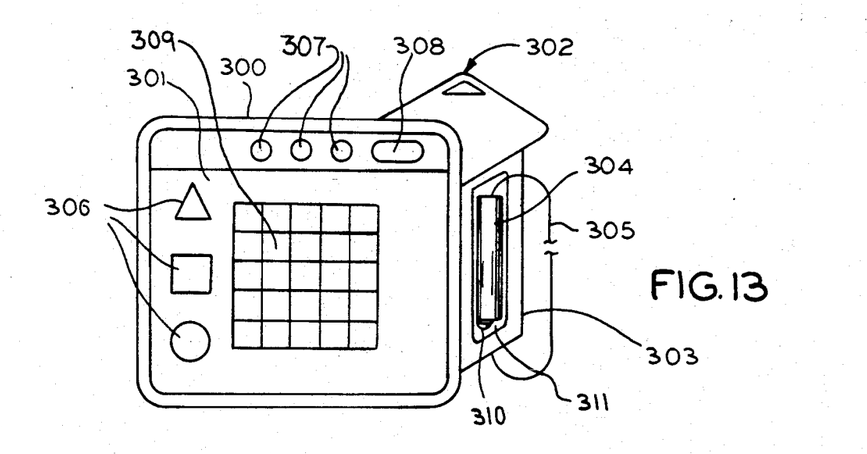
FIG. 13 of the drawings is a top plan view of the touch pad input device for use in association with the present invention, specifically showing the input wand placed in its cradle.

FIG. 13 illustrates remote input device 300 which is a touch sensitive input device utilizing touch sensitive surface 301 and wand 304. Touch sensitive surface 301 is shown comprising a writing surface 309 and input areas 306 which are shown comprising geometrical shapes, specifically triangle, square and circle. Moreover, remote input device 300 includes upon its touch surface 301 input areas 307 and 308 which correspond to standard keyboard commands such as escape, answer, erase and enter. Remote input device 300 communicates with base unit 23 via an infra-red signal which is emitted through infra-red transmission port 302. In operation, touch pad 300 is aligned with base unit 23 so as to direct infra-red signals emitting from port 302 towards the base unit infra-red receiving port 29. FIG. 12 further illustrates wand 304 which is shown operably tied to cabinet 303 via cord 305. Wand 304 is moreover shown residing in recess 311. Wand 304 specifically includes a touch point 310. Wand 304 is a non-electrical device and merely facilitates the depression of the touch sensitive surface 301 in place of the user's finger.

Figure 14:
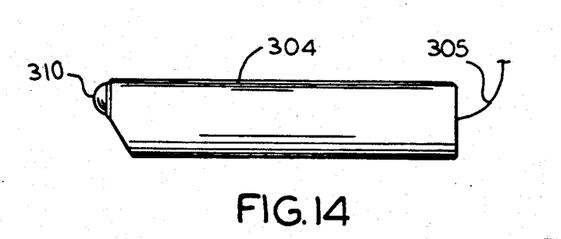
FIG. 14 is a side elevational view of the input wand used in association with the touch pad input device.
Figure 15:
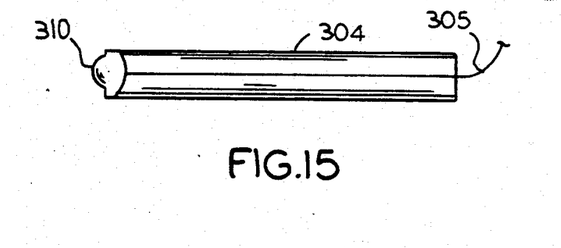
FIG. 15 of the drawings is a bottom plan view of the input wand.
Figure 16:
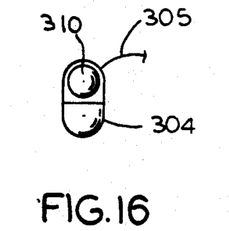
FIG. 16 of the drawings is a front elevation view of the input wand.

FIG. 14 of the drawings is a side elevational view of wand 304 specifically showing cord 305 and touch point 310. FIG. 15 is a bottom plan view of same while FIG. 16 is a front elevational view specifically showing touch point 310.

The foregoing description and drawings merely explain and illustrated the invention and the invention is not limited thereto, except insofar as the appended claims are so limited as those skilled in the art disclosure before them will be able to make modifications therein without departing from the scope of the invention.

What is claimed is:

1. An electronic educational video system apparatus for connection to a standard television receiver for teaching basic skills to a child through the use of animated pictorial displays which serve to motivate said child to utilize said apparatus and enhance said child's learning, said electronic educational video system apparatus comprising:

memory means for storing digital data corresponding to a plurality of pictorial representations, digital data corresponding to requests associated with said pictorial representations directing said child to provide a proposed correct response, said requests being both aural and textural, and digital data corresponding to the correct response to said requests associated with said pictorial representations;

display generating means electrically connected to said memory means for combining said data into said plurality of combinations and digitally generating video signals representative of said plurality of pictorial representations towards the generation of a single display incorporating said pictorial representations and said textual representations;

interface means electrically connected to said display generation means for providing said video signal to said television receiver towards displaying said pictorial representations and said associated requests thereon;

processor means electrically connected to said memory means and said display generation means;

said processor means for selecting one of said pictorial representations stored in said memory means and causing said selected pictorial representation to be displayed upon said television receiver and for causing said associated request to be presented to said child;

a plurality of interchangeable input means for permitting said child to provide a proposed correct response to said request;

means for comparing said child's proposed correct response with said correct response stored in said memory means;

means for animating said displayed pictorial representation associated with said request for proposed correct responses presented to said child so as to provide said child with an indication of the correctness of said child's proposed correct response.

2. The invention according to claim 1 in which said memory means comprises read-only-memory integrated circuit devices.

3. The invention according to claim 1 in which said input means comprises an alpha-numeric keyboard.

4. The invention according to claim 1 in which said input means comprises a touch-sensitive input pad.

5. The invention according to claim 1 in which said input means comprises a mouse cursor control device.

6. The electronic educational video system apparatus according to claim 1 in which said memory means, said display generation means, said interface means, said processor means, means for comparing and means for indicating the correctness of said proposed correct response are contained within a first housing means and wherein said input means is contained within a second housing means.

7. The invention according to claim 6 in which said second housing means is telescopically and removably received by said first housing means for permitting storage of said second housing means.

8. The invention according to claim 1 in which said input means are remote from and in wireless communication with said processor means 9. The electronic educational video system apparatus of claim 1 further including read-only-memory cartridges electrically and removably connected to said processor means enabling said apparatus to display additional pictorial representations having correct responses associated therewith.

10. The electronic educational video system apparatus of claim 1 further including sound generation means electrically connected to said processor means and said interface means for providing audio output signals to said child as an indication of the correctness of said child's proposed response.

11. The electronic educational video system apparatus of claim 1 further including voice synthesis means operably and electrically connected to said processor means and said interface means for providing said requests for proposed correct responses associated with said pictorial representations to said child in synthesized human speech and for providing said indication of the correctness of said child's proposed correct response in synthesized human speech.

12. The electronic educational video system apparatus of claim 1 further including means for presenting to said child clues to aid the child in determining the correct response to said presented request.

13. An electronic educational video system apparatus for connection to a standard television receiver for teaching spelling skills to a child through the use of animated pictorial displays which serve to motivate said child to utilize said apparatus and enhance said child's learning, said electronic educational video system apparatus comprising:

memory means for storing digital data, which data may be combined in a plurality of combinations, corresponding to a plurality of unique pictorial representations of common objects, digital data corresponding to requests associated with each one of said unique pictorial representations directing said child to provide the correct spelling of said unique pictorial representations, said requests being both aural and textural, and digital data corresponding to the correct spelling of each of said unique pictorial representations;

display generation means operably and electrically connected to said memory means for combining said data into said plurality of combinations and digitally generating video signals representative of said plurality of unique pictorial representations towards the generation of a single display incorporating said pictorial representations and said textural representations;

interface means operably and electrically connected to said display generation means for providing a video signal to said television receiver towards the display of said pictorial representations and said associated requests thereon;

processor means operably and electrically connected to said memory means and said display generation means;

said processor means for selecting one of said unique pictorial representations stored in said memory means and causing said selected pictorial representation to be displayed upon said television receiver and for causing said associated request to be presented to said child;

a plurality of interchangeable input means for permitting said child to provide a proposed correct spelling corresponding to said displayed pictorial representation;

means for comparing said child's proposed correct spelling with said correct spelling of said displayed pictorial representation stored in said emory means;

means for animating said displayed pictorial representation so as to provide said child with an indication of the correctness of said child's proposed correct spelling.

14. An electronic educational video system apparatus for connection to a single standard television receiver for teaching music skills to a child through the user of animated pictorial displays which serve to motivate said child to utilize said apparatus and enhance said child's learning, said electronic educational video system apparatus comprising:

memory means for storing digital data, which data may be combined in a plurality of combinations, corresponding to a pictorial representation of a musical keyboard and digital data corresponding to a plurality of musical notes, said notes being signified by both audible tones and textual musical symbols;

display generation means electrically connected to said memory means for combining said data into said plurality of combinations and digitally generating signals representative of said pictorial representation towards the generation of a single display incorporating said pictorial representation and said textual representation;

sound generation means electrically connected to said memory means for digitally generating audio signals representative of said audible tones;

interface means electrically connected to said display generation means and said sound generation means for providing a combined video and audio signal to said television receiver toward the display of said pictorial representation and the playing of said musical notes;

input means for permitting said child to designate a plurality of musical tones which are desired to be heard;

processor means electrically connected to said memory means, said display generation means and said sound generation means;

said processor means for causing said pictorial representation to be displayed upon said television receiver and for animating said displayed keyboard so as to simulate the movement of keys thereon in relation to the musical tones designated by said child and for causing said sound generation means to digitally generate audio signals representative of said musical notes designated by said child whereby said child is taught to associate specific musical notes with their representative position upon said keyboard.

* * * * *

UNITED STATES PATENT AND TRADEMARK OFFICE
CERTIFICATE OF CORRECTION

PATENT NO.  : 5,219,291
DATED       : June 15, 1993
INVENTOR(S) : Chi-Ming Fong, et al It is certified that error appears in the above-indentified patent and that said Letters Patent is hereby corrected as shown below:

| | |
|---|---|
| Col. 6, Line 32 | Delete "whith" and instead insert --with-- |
| Col. 6, Line 38 | Delete "WORK" and instead insert --WORD-- |
| Col. 10, line 63, | ""re" etc." should read --"re"... etc.-- |
| Col. 15, line 59, | delete "textural" should read --textual-- |
| Col. 15, Line 62 | Delete "generating" and instead insert --generation-- |
| Col. 16, Line 49 | Instead of "means" it should be --means.-- |
| Col. 17, Line 23 | Delete "textural" and instead insert --textual-- |
| Col. 18, Line 1 | Delete "emory" and instead insert --memory-- |
| Col. 18, Line 9 | Delete "through the user of" and instead insert --through the use of-- |

Signed and Sealed this

Twelfth Day of April, 1994

Attest:

BRUCE LEHMAN

*Commissioner of Patents and Trademarks*

*Attesting Officer*